Figure 1:
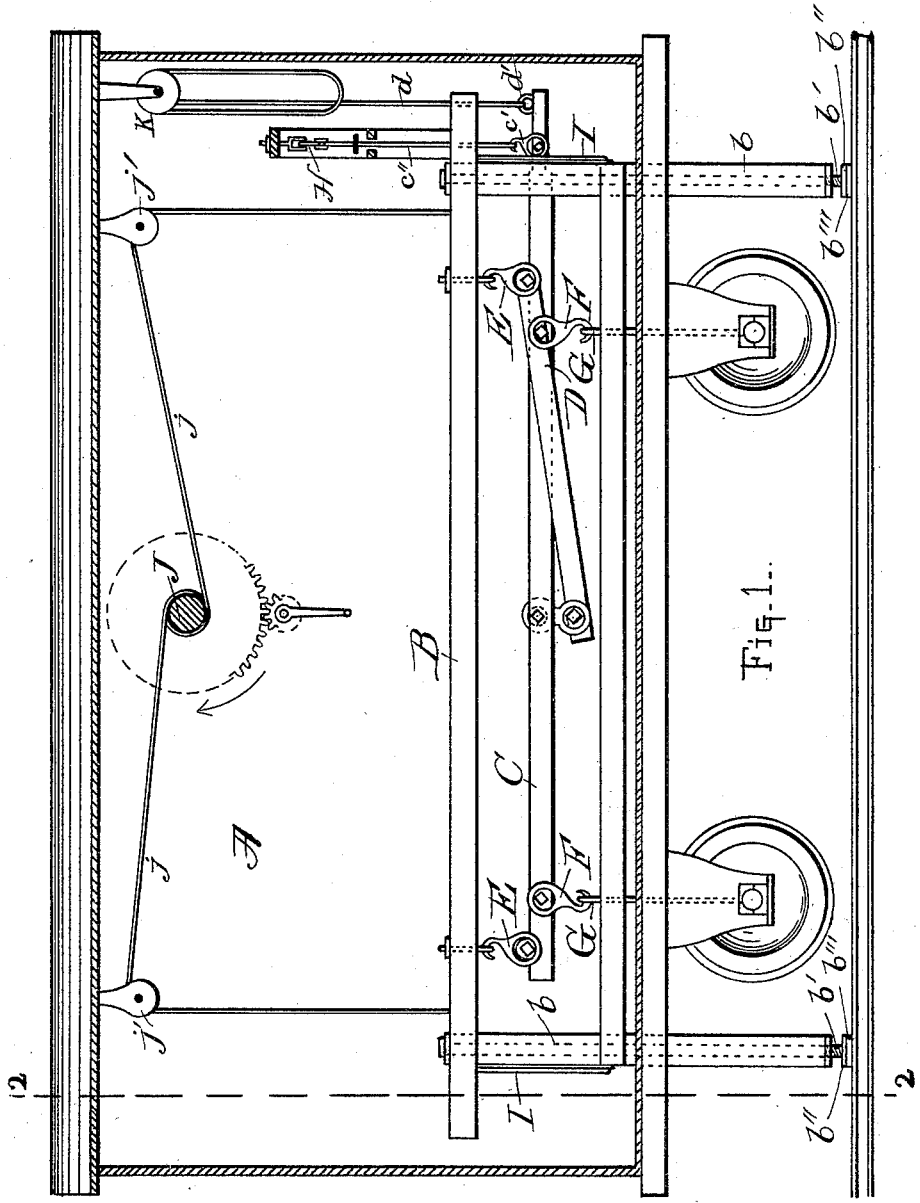

(No Model.)　　　　　　　　　　　　　　　　2 Sheets—Sheet 1.
T. M. TAYLOR.
WEIGHING CAR FOR TESTING RAILWAY TRACK SCALES.

No. 411,269.　　　　　　　　Patented Sept. 17, 1889.

Witnesses　　　　　　　　　　　　　　　　Inventor
Luke F. Hayden　　　　　　　　THOMAS M. TAYLOR.
A. O. Wood.　　　　　　　　By his Attorney
　　　　　　　　　　　　　　　Albert O. Wood (No Model.) 2 Sheets—Sheet 2.
T. M. TAYLOR.
WEIGHING CAR FOR TESTING RAILWAY TRACK SCALES.
No. 411,269. Patented Sept. 17, 1889.
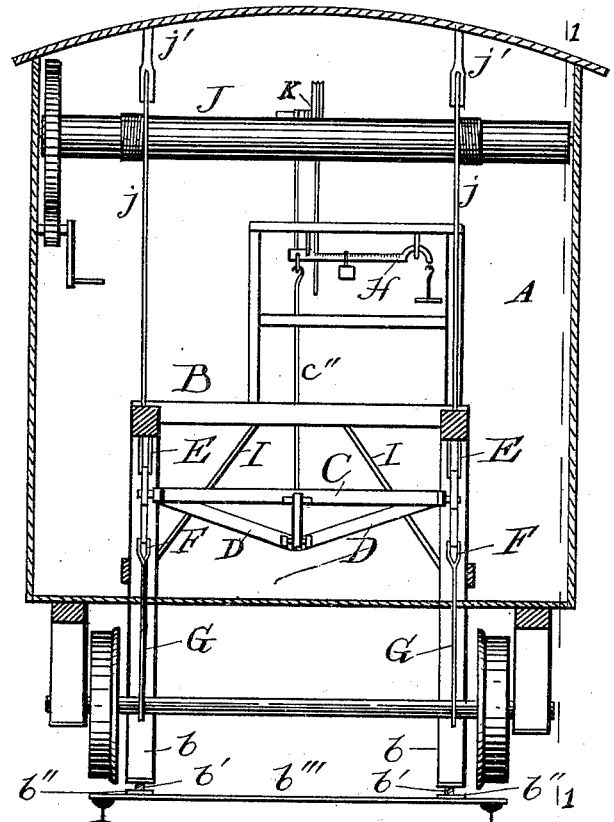
Fig. 2.
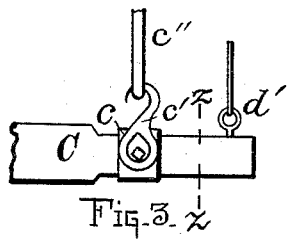 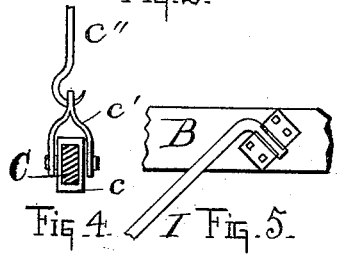 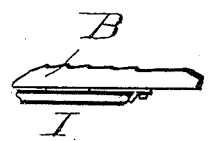
Fig. 3. Fig. 4. Fig. 5. Fig. 6.
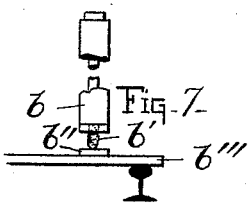
Fig. 7.
Witnesses
Luke F. Hayden.
A. P. Wood.
Inventor
Thomas M. Taylor
By his Attorney
Albert A. Wood

UNITED STATES PATENT OFFICE.

THOMAS M. TAYLOR, OF ATLANTA, GEORGIA.

WEIGHING-CAR FOR TESTING RAILWAY-TRACK SCALES.

SPECIFICATION forming part of Letters Patent No. 411,269, dated September 17, 1889.

Application filed April 22, 1889. Serial No. 308,195. (No model.)

*To all whom it may concern:*

Be it known that I, THOMAS M. TAYLOR, a citizen of the United States, and a resident of Atlanta, in the county of Fulton and State of Georgia, have invented certain new and useful Improvements in Weighing Devices for Testing Railway-Scales; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has reference to test-cars, and has more particular reference to such construction of test-car as will insure its absolute correctness as to weight when placed in position to test the scales used in railway-tracks for weighing rolling stock, loaded or otherwise; and to attain this end the invention consists of details hereinafter fully set forth and claimed.

In the accompanying drawings, Figure 1 is an elevation in longitudinal vertical section on the line 1 1, Fig. 2, showing the scale-levers, their connection, the frame for sustaining the car while in process of being weighed, and the various minor details necessary to operate same. Fig. 2 is a vertical cross-section on the line 2 2, Fig. 1, further showing the details of construction. Fig. 3 is a detail of the attachment of the scale-rod to the end of the main lever, and Fig. 4 is a vertical cross-sectional view of the same. Fig. 5 is a detail of the attachment of the corner-braces of the frame, and Fig. 6 is an edge view of the same from the top in Fig. 5. Fig. 7 is a side elevation of the device for making small adjustments in leveling the frame supporting the car when the car is in process of being weighed.

In the figures, like reference-marks indicating corresponding parts in the several views, A is the car, and B the supporting-frame, to the top bars of which are hung, by means of loops of any desired construction, the levers C and D. It is obvious that these levers may be of any size and of any construction, provided, of course, that the proportions of distances are adhered to according to the well-known rules of scale-making; hence I do not confine myself to the specific manner of constructing the levers shown. As hereinbefore stated, the levers C D are hung from the top bars of the frame B by loops E, which in the construction shown form the fulcrums, while the opposing loops F are attached by rods G, preferably adjustable by means of turn-buckles placed at intermediate points therein to the axles of the car, said rods G having any suitable means on their bottom ends for grappling with the said axles, and securely holding the same while the car is held in suspension on the frame.

Attached to the extreme outer end of the lever C (see Figs. 3 and 4) is the adjustable sleeve $c$, which carries knife-edges or pivots, as desired, for the attachment of the loop $c'$, to which is attached the rod $c''$, running to the scale-beam H, whereon is indicated the weight of the car. Attached also to this lever C at a convenient point is a rope or chain $d$, which runs through a small hoisting device for raising the outer end of said lever C, which will, when the frame B rests on the track, obviously raise the car from the track, supporting it on the levers C D. As soon as the car is raised from the track the rope $d$ is released, the rod $c''$ being previously attached to the sleeve $c$.

Passing vertically through each of the uprights $b$ are the adjusting-screws $b'$, which are screw-threaded on their lower ends and pass through an internally-screw-threaded nut on the bottom of each of the said uprights $b$. These screws $b'$ are for the purpose of leveling the frame B as it rests on the ties, ground, or, as is preferable, on a platform $b'''$, placed across the track on top of the rails. The lower ends of these said screws $b'$ are pivot-pointed and rest in steps $b''$ to insure a reliable bearing on the platform $b'''$.

To stiffen the structure of the frame, braces I are used in its corners, and to facilitate the taking down of the said frame I prefer the use of socket-irons, substantially as shown in Figs. 5 and 6, as the ends of said braces will be therein securely held, and can be easily removed when desired.

In the top of the car or other convenient position is a windlass J, properly geared to lift the desired weight. From this windlass to the corners preferably of the frame B run ropes $j$, passing through sheaves $j'$, secured in the roof of the car. This is for the purpose of lifting the frame B from the track, or even out of the slots in the bottom of the car, if desired. This device may be duplicated in the two ends of a long car, the one shown being a short car, proportionately about sixteen feet in length, which length is preferable on account of the construction of the regulation truck for such length of car, any amount of weight which the short car might fall short of the requisite weight being obtained by loading the car. In case this car is used by the operator who is to repair any deficiency in the scale, it might be desirable to make any or all of the parts easily removable to make room for apparatus in use in effecting such repairs. In case it is desired to lift the frame B to the top of the car, it will be necessary that the frame carrying the indicating scale-beam be removable, and in any case the rods connecting with the axles of the car must be disconnected from the loops of the levers C D.

The operation of this device is as follows: We will suppose that the device has just been used and moved on to the next place, the lever C being detached from the indicating-beam and the frame B being necessarily raised so that the lower ends of the corner-posts $b$ are high enough to avoid hitting the track in transit, the end of the lever C resting on a cross-bar in the frame B to avoid striking the car-floor, and the rods G being detached from the axles to allow the raising of said frame B, and said raising being accomplished by the windlass and its connections with the frame. The weight of the weighing apparatus is known and is to be added to the net weight of the car proper when such net weight is ascertained. As the weight of the beam, levers, frame, &c., just mentioned as the weighing apparatus, these parts not being subject to wear and hence repairs, is practically unchangeable, and hence the fact that these weighing apparatus are not weighed each time does not deduct in the slightest from the practical utility and efficiency of the device. To ascertain the net weight of the car, which is the first thing to be done in the operation, we proceed as follows: The frame B is lowered through the holes in the floor of the car so as to allow the lower ends of the corner-posts of the frame to come in contact with the ties, rails, or the platform herein described, to afford a secure foundation for said frame, after which the grappling-rods are secured to the axles of the car and to the loops on the levers C D. The frame B is now resting on the platform, as shown in Fig. 1, but as yet the lever C is not raised, as shown in that figure. To raise the lever C, which, as hereinbefore stated, raises the car and holds it in suspension on the frame, the rope $d$ is hooked into the eye $d'$ in the end of said lever C and drawn up on the tackle or windlass K until raised to such a height as will permit the introduction of the hook on the lower end of rod $c''$ into the hook on the loop $c'$, which communicates force from the lever C to the indicating scale-beam H, and, as the car is held by the lever C D and their connections in suspension on the frame B, the weight of the car will be indicated on said indicating-beam H. This net weight of the car is then to be added to the known and unchangeable weight of the weighing apparatus, and the sum of the two is the weight which would be indicated on a correct track-scale when the test-car was superimposed on its platform. As soon as the weighing of the car proper is accomplished, as just described, the end of the lever C is raised by the tackle attached to its outer end, and the rod $c''$ disengaged therefrom, after which the lever is lowered to the floor of the car, which lowers the car from suspension to its normal position on the track, after which the rods are detached from the axles and the frame B and its contained parts raised to the desired height to allow the movement of the car to its desired position on the track-scales necessary to test the same, after which the operation is as usual in testing scales of this class. The net weight of the car, obtained by the just-described process, is to be added to the known and unchangeable weight of the weighing apparatus, and the sum of the two is the proper weight to be indicated by the track-scales when the car is placed thereon and said scales indicate correctly.

If desired, the various parts of the weighing apparatus may be made easily removable, and when so removed the interior of the car may be used as a shop-car, suitable adjustable benches and tool depositories being built into the walls of the car in any approved form or manner.

Having thus described my invention, what I claim as new, and desire to secure by Letters Patent of the United States, is—

1. As an improvement in cars for testing railway-scales, the car A, provided with hoisting devices such as described, and the frame B, having attached to it the weighing device, substantially as shown and described.

2. As an improvement in cars for testing railway-scales, the frame B, supports for said frame, consisting of the uprights $b$, provided with screws $b'$, fitting in steps $b''$, the removable rods I, for bracing said frame B, and the uprights $b$, substantially as shown and described.

3. As an improvement in cars for testing railway scales, the frame B, levers C and D, suspended on said frame and attached to the axles of the car, as specified, the said lever C having on its outer end the sleeve $c$, carrying pivots for the loop $e'$, the loop $e'$ and the rod $c''$, connecting with the beam H, all combined, arranged, and operating substantially as shown and described.

In testimony whereof I hereunto affix my signature in presence of two witnesses.

THOMAS M. TAYLOR.

Witnesses:
A. P. WOOD,
E. P. THOMAS.